United States Patent [19]

Pastor et al.

[11] Patent Number: 4,756,901

[45] Date of Patent: Jul. 12, 1988

[54] PURIFICATION OF $(Nb_{1-x}Ta_x)_2O_5$

[75] Inventors: Ricardo C. Pastor, Manhattan Beach; Luisa E. Gorre, Oxnard, both of Calif.

[73] Assignee: Hughes Aircraft Company, Los Angeles, Calif.

[21] Appl. No.: 943,029

[22] Filed: Dec. 18, 1986

[51] Int. Cl.[4] .................... C01G 33/00; C01G 35/00
[52] U.S. Cl. .................................. 423/593; 423/592
[58] Field of Search ............................. 423/593, 592

[56] References Cited

U.S. PATENT DOCUMENTS 3,437,430 4/1969 Bielecki et al. ................ 423/592 X

OTHER PUBLICATIONS

Kirk–Othmer, *Encyclopedia of Chemical Technology*, 3rd Ed. (1983), vol. 22, pp. 548–549.

*Primary Examiner*—Patrick P. Garvin
*Attorney, Agent, or Firm*—Wanda K. Denson-Low; V. G. Laslo; A. W. Karambelas

[57] ABSTRACT

$(Nb_{1-x}Ta_x)_2O_5$ ("NTO") is purified of undesirable impurity elements present in small amounts by contacting the NTO in finely divided form to an extraction phase containing chloride, bromide, or iodide ions at a temperature whereat the ions react to remove the impurities into the extraction phase, and then the extraction phase is separated from the finely divided NTO. The process is particularly valuable in removing 3d impurities such as iron and titanium. The process can be carried out by liquid phase extraction, as with an azeotropic aqueous hydrochloric acid extraction from the NTO, or by gas phase reaction, as by reacting carbon tetrachloride with the NTO.

18 Claims, 1 Drawing Sheet

PURIFICATION OF $(Nb_{1-x}Ta_x)_2O_5$

BACKGROUND OF THE INVENTION

This invention relates to the purification of solid materials, and, more particularly, to the removal of impurities from $(Nb_{1-x}Ta_x)_2O_5$.

High purity, nearly perfect single crystals are used in a wide variety of electronic, optical, electro-optical, and other applications because of particular properties found in such single crystals of selected compositions. In some cases, the single crystals are usually prepared by first providing a precursor material in a highly purified form, and then transforming the pure precursor material into a single crystal of the composition desired.

A technologically important example is found in the precursor material $M_2O_5$, where M is $(Nb_{1-x}Ta_x)$, with x varying from 0 to 1. When x is 0, the precursor material is $Nb_2O_5$, which can be transformed to single crystals of $KNbO_3$. When x is 1, the precursor material is $Ta_2O_5$, which can be transformed to single crystals of $KTaO_3$. When x is between 0 and 1, the precursor material is $(Nb_{1-x}Ta_x)_2O_5$, which can be transformed to single crystals of intermediate composition $KNb_{1-x}Ta_xO_3$, also known as KTN. These single crystals are used in electro-optical applications, wherein the refractive index of the crystal can be altered by application of an electric field, and in some cases can be used to sense heat through the pyroelectric effect.

The performance of the single crystals prepared by this approach is heavily dependent upon the types and amounts of impurities in the precursor material. To cite two particular examples, metal-ion impurities having at least two stable valence states, such as elements in the 3d period of the periodic table, can play the role of electron donors or acceptors. Impurities with one stable valence state that is not matched in oxidation number to the host constituent for which they substitute cause charge compensation processes. Color centers can result from these processes, which adversely affect the optical transparency and polarization behavior of the crystal, and increase the electrical conductivity of the crystal so as to possibly permit the crystal to electrolyze.

An important feature of the preparation of single crystals of these types is therefore the reduction of the impurity contents, particularly for those impurity elements that interfere with the electro-optical properties of the crystals. A number of approaches have been tried for reducing the impurity levels, but none has proved sufficiently effective for general use in preparing such crystals. In the past, $(Nb_{1-x}Ta_x)_2O_5$ has been purified as the acid, the term used to describe the related hydrated oxide $H(Nb_{1-x}Ta_x)O_3 \cdot yH_2O$. The acid is obtained from ore by alkaline fusion followed by boiling. The acid then precipitates out during hydrolysis. This highly dispersed material is purified of various impurities in a series of tedious procedures wherein one or a few impurities at a time are removed. For example, tin and antimony are removed by digesting the precipitated acid with ammonium sulfide solution. Tungsten is extracted by digestion with dilute ammonia or ammonium carbonate, or by digesting with warm sodium hydroxide solution and boiling with an excess of ammonium nitrate. Silica is removed with hydrofluoric and sulfuric acids. Titanium is removed by adding an excess of salicylic acid and boiling in a reflux condenser, followed by filtration and precipitation of the titanium with ammonia. Zirconium is separated by fusion with bisulfate, the melt being extracted with dilute sulfuric acid to dissolve the zirconium sulfate. After purification, ignition of the purified acid yields $(Nb_{1-x}Ta_x)_2O_5$.

In another prior approach, hydrolysis of a purified pentachloride $(Nb_{1-x}Ta_x)Cl_5$ produces a purified acid. However, neither of these approaches, nor any other presently known, is effective in removing the harmful 3d impurities. Accordingly, there exists a need for an effective, economical process for removing impurities from single crystal precursor materials of the type $(Nb_{1-x}Ta_x)_2O_5$. The present invention fulfills this need, and further provides related advantages.

SUMMARY OF THE INVENTION

The present invention is embodied in a treatment for $(Nb_{1-x}Ta_x)_2O_5$ ("NTO") precursor materials, which is effective in removing impurities from the NTO prior to its use in preparing single crystals or compacts. The invention is accomplished at relatively low and intermediate temperatures, and neither high temperature equipment nor high temperature exposure of the NTO is required. Readily available chemicals are used in the purification process, and the process is practiced in readily available laboratory or commercial apparatus. Moreover, the purification process is safe and inexpensive to perform, and extended purification procedures can be performed in a normal laboratory or commercial environment.

In accordance with the invention, a process for purifying compounds of the form $(Nb_{1-x}Ta_x)_2O_5$, where x ranges from 0 to 1, comprises the steps of furnishing the $(Nb_{1-x}Ta_x)_2O_5$ in a finely divided form; contacting an extraction phase containing a source of halide ions selected from the group consisting of a chloride, a bromide, and an iodide, with the finely divided $(Nb_{1-x}Ta_x)_2O_5$ at a temperature whereat the halide ions react with the impurities in the $(Nb_{1-x}Ta_x)_2O_5$, whereupon the reacted impurities are extracted from the finely divided $(Nb_{1-x}Ta_x)_2O_5$ into the extraction phase; and separating the extraction phase and the reacted impurities contained therein from the finely divided $(Nb_{1-x}Ta_x)_2O_5$.

As used herein, $(Nb_{1-x}Ta_x)_2O_5$ includes the compounds $Nb_2O_5$ (when x is 0), $Ta_2O_5$ (when x is 1), and intermediate compounds where x ranges between 0 and 1. The term $(Nb_{1-x}Ta_x)_2O_5$, as used herein, is synonymous with the terms niobium-tantalum-oxide and NTO, and these shorthand forms are sometimes used for compact expression.

In one preferred form of the invention, a continuous liquid extraction process for purifying compounds of the form $(Nb_{1-x}Ta_x)_2O_5$, where x ranges from 0 to 1, comprises the steps of furnishing the $(Nb_{1-x}Ta_x)_2O_5$ in a finely divided form contacting an aqueous azeotropic mixture of an acid selected from the group consisting of hydrochloric acid, hydrobromic acid, and hydroiodic acid, and mixtures thereof, to the finely divided $(Nb_{1-x}Ta_x)_2O_5$, whereupon impurities in the $(Nb_{1-x}Ta_x)_2O_5$ are extracted into the azeotropic mixture; collecting the azeotropic mixture, with the extracted impurities, in a reservoir; and evaporating azeotropic mixture from the reservoir and condensing the evaporated material at a location so that it may again contact the finely divided $(Nb_{1-x}Ta_x)_2O_5$, whereupon the impurities remain in the reservoir and are collected therein. The preferred azeotropic acid extractant is hydrochloric acid, which readily dissolves the 3d impurities, is inexpensive, and is relatively easy to work with. The azeotropic mixture of hydrochloric acid and water is about 6N, or about 20.2 percent by weight acid.

In a most preferred form of this embodiment, the liquid extraction process is carried out in a Soxhlet extraction apparatus. The finely divided starting material, containing impurities, is placed into an extraction thimble and contacted to the preferred hydrochloric acid at an appropriate temperature, as, for example, just below the boiling point of the extraction liquid. Impurities are reactively leached out of the finely divided starting material by prolonged contact with the acid, and are transferred to the acid. After a period of leaching, the acid is siphoned out or otherwise separated from the finely divided $(Nb_{1-x}Ta_x)_2O_5$ and conducted to a reservoir. Once the acid is collected in the reservoir, it is boiled at about 110° C. to drive off a vapor of the acid-water mixture. Because the mixture is azeotropic, acid and water are evaporated such that the evaporant remains at the azeotropic composition. During evaporation, which is essentially a distillation process, the impurities remain in the reservoir. The evaporated hydrochloric acid-water mixture is condensed and recycled to contact the finely divided starting material, which now has some fraction of the impurities removed due to the first cycle of extraction. The extraction process can be repeated through many cycles, to remove a large portion of the impurity material.

In another preferred embodiment, chloride ions are provided in a gas extraction phase. In accordance with this embodiment, a process for purifying compounds of the form $(Nb_{1-x}Ta_x)_2O_5$, where x ranges from 0 to 1, comprises the steps of furnishing the $(Nb_{1-x}Ta_x)_2O_5$ in a finely divided form; contacting a gas containing a chloride with the finely divided $(Nb_{1-x}Ta_x)_2O_5$ at a sufficiently high temperature that impurities in the $(Nb_{1-x}Ta_x)_2O_5$ react with the chloride in the gas to produce volatile chlorides of the impurities, which volatile chlorides of the impurities enter the gas phase and are thereby extracted from the finely divided $(Nb_{1-x}Ta_x)_2O_5$; and separating the gas phase from the finely divided $(Nb_{1-x}Ta_x)_2O_5$. The preferred chloride in the gas phase is a chloride of the form $CH_zCl_{4-z}$, where z ranges from 0 to 3, and the presently most preferred chloride is carbon tetrachloride, $CCl_4$, with z of 0.

This gas phase extraction procedure is effective because the chlorides of most of the important impurities are volatile at a selected reaction temperature. Formation of the chloride of the $(Nb_{1-x}Ta_x)_2O_5$, while thermodynamically favored, occurs only very slowly at the selected temperature, so that the impurities are preferentially removed. The process is preferably performed by placing finely divided $(Nb_{1-x}Ta_x)_2O_5$ into a nonreactive ceramic boat in a tube furnace. The preferred carbon tetrachloride, carried by a carrier gas such as carbon dioxide, is passed over the oxide at a temperature sufficiently high to obtain a reaction between the carbon tetrachloride and the impurity atoms and ions, thereby producing the chloride of the impurity atom or ion. The chlorides are volatile, enter the flowing gas phase, and are removed. The temperature of this process is preferably from about 400° C. to about 750° C., most preferably from about 400° C. to about 600° C. to reduce the loss of the base material during extraction of the impurities.

Thus, reaction of the impurities with the contacted ions permits their extraction into a gas or liquid phase. The impurities are removed from the vicinity of the $(Nb_{1-x}Ta_x)_2O_5$ and disposed of, while the oxide of reduced impurity content is used as the starting material for crystal growth or compaction into powder specimens. The precursor material $(Nb_{1-x}Ta_x)_2O_5$ can be purified of a large portion of the impurity content, including most of the 3d impurities. The finely divided material is not altered and remains in its finely divided form, except for the removal of the impurities, and can then be used in its normal uses.

It will now be appreciated that the present invention presents an advance in the field of preparing high purity precursor materials. A large fraction of the impurity content can be removed from powder or other finely divided material in a process that does not alter the desired oxide. Other features and advantages of the invention will be apparent from the following more detailed description, taken in conjunction with the accompanying drawings, which description illustrates, by way of example, the principles of the invention.

DETAILED DESCRIPTION OF THE PREFERRED EMBODIMENT

Figure 1:
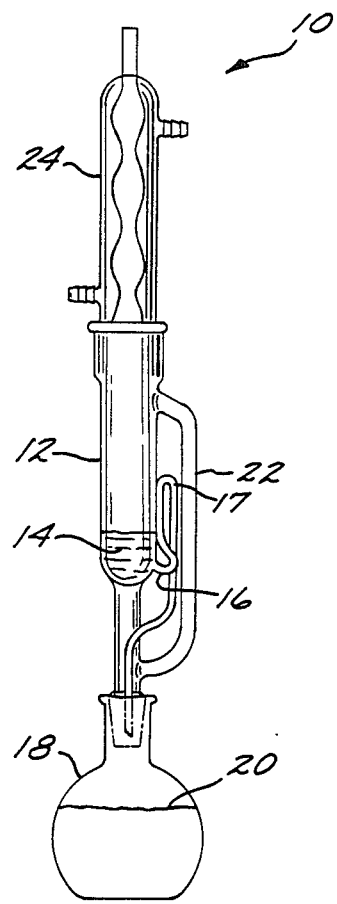
FIG. 1 is a side elevational view of a liquid extraction apparatus for practicing one embodiment of the invention.

In one aspect, the present invention is embodied in a liquid extraction process using an extraction apparatus 10 illustrated in FIG. 1. This process of the invention is operable with a wide variety of extraction procedures and apparatus, but the apparatus 10, commonly known as a Soxhlet apparatus, is preferred. The apparatus 10 permits the continuous extraction of impurities through a cyclic sequence of evaporation, condensation, and contacting of the extractant to the material to be purified, and collecting of the impurity-loaded extractant for subsequent evaporation.

The apparatus 10 includes an extraction tube 12, which contains a mass 14 of finely divided $(Nb_{1-x}Ta_x)_2O_5$ particles, as for example $-325$ mesh powder. The $(Nb_{1-x}Ta_x)_2O_5$ is furnished in a finely divided form having a large amount of reactive surface area in proportion to the volume of material, to permit close and extensive contact between the extractant liquid and the solid, thereby reducing the time required to achieve and selected degree of purification.

The extractant is contacted to the solid to extract impurities into the liquid phase. After a period of contact between the solid phase and the extractant, the extractant liquid is removed from contact with the mass 14, by siphoning through a siphon 16. The siphon 16 is a hollow tube that extends from the interior of the tube 12 to its exterior and, outside the tube 12, extends upwardly to an upper bend 17 before turning downwardly. The siphoning action occurs when the liquid level of extractant in the tube 12 rises above the level of the upper bend 17. At that point, liquid extractant loaded with impurities extracted from the mass 14 is siphoned from the tube 12. The liquid extractant remains in contact with the mass 14 of impure solid for a time prior to its removal through the siphon 16, leaching impurities from the solid into the liquid by reaction with the acid of the extractant.

Liquid extractant removed from the extraction tube 12 flows downwardly to a reservoir 18, commonly a flask below the extraction tube 12. A pool 20 of impure liquid extractant forms in the bottom of the reservoir 18.

The pool 20 is heated so that liquid extractant is evaporated from its surface into a transfer tube 22, which conducts the vapor to a point above the mass 14 of solid in the extraction tube 12. The evaporation process is a distillation, and the evaporated liquid extractant does not carry with it the previously extracted impurities, which are left behind in the pool 20. The liquid in the pool 20 thence becomes increasingly more concentrated in impurity with successive cycles of extraction, and is eventually discarded upon completion of a number of extraction cycles.

The extractant vapor from the transfer tube 22 is condensed by a condenser 24 that is positioned above the extraction tube 12. Cold water is continuously circulated through the condenser 24 so that the extractant vapor is cooled below its boiling point and condensed. The condensed, liquid extractant then falls downwardly in the extraction tube 12, back into the mass 14 of finely divided $(Nb_{1-x}Ta_x)_2O_5$ particles, and the process is repeated.

The choice of extractant liquid is important in this embodiment. Hydrochloric acid is chosen as the most preferred extractant, as the chlorides of the impurities in the $(Nb_{1-x}Ta_x)_2O_5$ are soluble and can be extracted into the acid. The composition of the hydrochloric acid is selected as the azeotropic composition, which is an aqueous mixture with a boiling point such that the composition that is evaporated is the same as the liquid from which it was evaporated. The composition of the vapor remains substantially constant through multiple cycles of extraction, and equal to the composition of the liquid acid in the pool 20 (although the pool becomes increasingly enriched in impurities). The azeotropic composition of hydrochloric acid is about 6N (6 Normal), which is about 20.2 weight percent hydrochloric acid, remainder water. The boiling point of the azeotropic composition is about 110° C., so that the liquid in the reservoir 18 need not be heated above this temperature. The multiple extraction cycles in the apparatus 10 an therefore be conducted in a laboratory or production environment without the need for special protection or heating equipment.

While hydrochloric acid is the most preferred extractant, others may be used. One is the azeotropic mixture of hydrobromic acid, whose composition is about 47 weight percent HBr with a boiling point of 126° C. Another is the azeotropic mixture of hydriodic acid, whose composition is about 57 weight percent HI with a boiling point of 127° C. These heavier acid extractants have a higher boiling point, but also include the heavier halide ions. These acids are operable because the corresponding 3d salts are all soluble and are removed by leaching.

It is understood that the extraction using the particular apparatus 10 is convenient, but that other types of apparatus can be used to perform the extraction. For example, the extraction could be performed in a breaker, with the liquid decanted after an extraction cycle. If new extractant is used for each extraction cycle, the composition of the extractant is not limited to the azeotropic composition, because retention of the constant composition upon boiling is not required.

Figure 2:
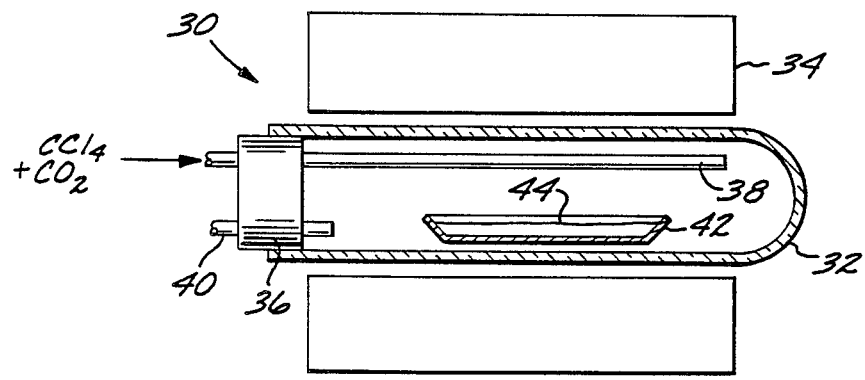
FIG. 2 is a side elevational view, with portions broken away for clarity, of a gas reaction apparatus for practicing another embodiment of the invention.

Alternatively, the extraction may be accomplished through a gaseous reaction, in an apparatus 30 illustrated in FIG. 2. The apparatus 30 includes an extraction tube 32 placed within a furnace 34. The extraction tube 32 is closed on one end, and sealed with a stopper 36 at the other end. A gas introduction tube 38 passes through the stopper 36 and extends to the far end of the extraction tube 32, to a point adjacent to the closed end of the extraction tube 32. A gas removal tube 40 passes through the stopper 36, but extends only a short distance into the extraction tube 32. A boat 42 contains a mass 44 of finely divided $(Nb_{1-x}Ta_x)_2O_5$ particles.

The apparatus 30 permits gas to be continuously flowed over the mass 44, flowing from the gas introduction tube 38 to the gas removal tube 40. The gas contains an active chloride. The temperature of the furnace 34, and thence the mass 44, is chosen to be sufficiently high that the chloride reacts with the impurities in the $(Nb_{1-x}Ta_x)_2O_5$.

Most preferably, the gas phase contains carbon tetrachloride ($CCl_4$), which reacts with the impurities to produce volatile chlorides at sufficiently high reaction temperatures, as from about 400° C. to about 750° C. The process is operable at higher and lower temperatures, but at lower temperatures the kinetics of the reaction are slow. At higher temperatures the chloride reacts extensively with the $(Nb_{1-x}Ta_x)_2O_5$, so that some of the desirable material is volatilized and removed along with the impurities, thereby reducing the efficiency of the process. The most preferred temperature range for the reaction is from about 400° C. to about 600° C., because the efficiency of the process falls at higher temperature due to the reactivity of the $(Nb_{1-x}Ta_x)_2O_5$. The reactive chloride is typically mixed with a carrier gas to dilute it somewhat, and the preferred carrier gas is carbon dioxide ($CO_2$).

Other chloride-containing gases are also operable, such as gases containing a compound of chlorine with carbon. Molecules with a single carbon atom are preferred, to achieve good volatility. Molecules of the general form $CH_zCl_{4-z}$, with z from 0 to 3, inclusive, may be used. As the value of z increases, HCl gas is also present in the gas phase, which is satisfactory as a reactant. When z is 0, the molecule represents carbon tetrachloride $CCl_4$, the presently most preferred reactant.

The process of FIG. 2 accomplishes the extraction and removal of impurities from the $(Nb_{1-x}Ta_x)_2O_5$ without contacting the solid to a liquid. On the other hand, the required temperature of the extraction using the process of FIG. 2 is greater than that of the process of FIG. 1, but not so excessively high as to be impractical. Both processes therefore produce acceptable results, and the selection of one of these processes, or another process consistent with the broad concept of the invention, will depend upon the particular circumstances of any particular extraction.

The following examples serve to illustrate aspects and features of the invention, but should not be taken as limiting of the scope of the invention in any respect.

EXAMPLE 1

The apparatus of FIG. 1 was used to perform a liquid extraction of impurities from finely divided $(Nb_{1-x}Ta_x)_2O_5$. Sixty grams of 99% purity $Nb_2O_5$ powder starting material was placed into the extraction tube of a Soxhlet apparatus, and an azeotropic mixture of hydrochloric acid was placed into the reservoir of the Soxhlet apparatus. The acid was heated to its boiling point, 110° C., to initiate an extraction cycle. A single cycle required about 20 minutes, and 180 consecutive cycles were performed.

At the completion of the extraction procedure, the remaining liquid in the reservoir was boiled down from 300 milliliters to 100 milliliters, and the extracted material was precipitated by neutralization of the solution to a pH of 7 with ammonium hydroxide. About 0.1 gram of solid extractant was produced. The collected solid extractant was chemically analyzed by emission spectrographic analysis, and may be compared with the composition of the original 99% purity material. In the following table, compositions are given in atomic percent. The terminology "LT" means that the particular element has a content so low that it cannot be detected by emission spectrography, and therefore must have a composition less than the detection limit for that element, which is the figure given.

| Element | Starting Material | Extracted Material |
| --- | --- | --- |
| Niobium | 69 | 21 |
| Silicon | LT 0.01 | 29 |
| Iron | LT 0.06 | 1.5 |
| Zirconium | LT 0.01 | 0.22 |
| Magnesium | LT 0.0006 | 0.010 |
| Aluminum | LT 0.04 | 2.1 |
| Gallium | LT 0.10 | 0.48 |
| Titanium | LT 0.02 | 0.16 |
| Barium | LT 0.60 | LT 0.60 |
| Calcium | LT 0.002 | 0.019 |

It is apparent that the composition of the extracted material is lower than the starting material in niobium, but much higher in the indicated impurities. From this result, it may be concluded that the extraction operation preferentially extracted the impurities, leaving the starting material substantially more pure than it was initially. The 3d impurities, such as iron and titanium, are preferentially removed, as are those elements whose oxidation numbers do not match those of the host constituents but for which they may substitutionally incorporate (e.g., silicon, zirconium, aluminum, gallium, magnesium, and calcium).

EXAMPLE 2

A gas phase extraction using the apparatus of FIG. 2 was performed. Thirty-six grams of 99 percent purity $Nb_2O_5$ powder starting material was placed into the boat, and a mixture of 10–15 percent by volume carbon tetrachloride in carbon dioxide was flowed over the boat for 24 hours. The temperature of the furnace was maintained at 750° C. The composition of the starting material was as shown in the table in Example 1 above. As the extraction gas cooled after passing over the material in the boat, solid extracted material was deposited and later was collected for analysis. The amount of extracted solid was small, and only limited data on its composition was obtained by spectrographic emission analysis. The extracted solid residue was found to contain 49 percent niobium, 14 percent silicon and 0.090 percent aluminum. These results again demonstrate that the impurities are preferentially removed during the gaseous extraction process.

However, the amount of niobium removed was higher than desired. It is therefore believed that an extraction temperature of about 400° C. to about 600° C. would have sufficed, as a lower extraction of niobium from the host material would result.

The preceding disclosure and examples demonstrate that the process of the invention successfully purifies $(Nb_{1-x}Ta_x)_2O_5$, removing impurities that interfere with its functioning in electro-optical and other applications. In both of the preferred processes, the finely divided powder starting material remains a finely divided powder through the extraction treatment, and can then be processed to a single crystal or powder compact by the usual procedures. The processes do not require exotic chemicals, apparatus, or conditions, and are therefore suitable for laboratory or industrial purification procedures. The chemical behavior of tantalum, and mixtures of tantalum and niobium, in processes such as that described herein is very similar to that of niobium, with comparable results.

Although a particular embodiment of the invention has been described in detail for purposes of illustration, various modifications may be made without departing from the spirit and scope of the invention. Accordingly, the invention is not to be limited except as by the appended claims.

What is claimed is:

1. A process for purifying compounds of the form $(Nb_{1-x}Ta_x)_2O_5$, where x ranges from 0 to 1, comprising the steps of:

furnishing the $(Nb_{1-x}Ta_x)_2O_5$ in a finely divided form;

contacting a liquid extraction phase containing a source of halide ions, wherein the source of halide ions is selected from the group consisting of hydrochloric acid, hydrobromic acid and hydroiodic acid, with the finely divided $(Nb_{1-x}Ta_x)_2O_5$ at a temperature whereat the halogen ions react with impurities in the $(Nb_{1-x}Ta_x)_2O_5$, whereupon the reacted impurities are extracted from the finely divided $(Nb_{1-x}Ta_x)_2O_5$ into the liquid extraction phase; and separating the liquid extraction phase and the reacted impurities contained therein from the finely divided $(Nb_{1-x}Ta_x)_2O_5$.

2. The process of claim 1, wherein said step of contacting is accomplished by percolating the extraction phase through the finely divided $(Nb_{1-x}Ta_x)_2O_5$.

3. The process of claim 1, wherein the extraction phase contains HCl as the source of the halide ions.

4. The process of claim 1, wherein the extraction phase is a gas.

5. A process for purifying compounds of the form $(Nb_{1-x}Ta_x)_2O_5$ where x ranges from 0 to 1, comprising the steps of:

furnishing the $(Nb_{1-x}Ta_x)_2O_5$ in a finely divided form;

contacting an extraction phase containing $CCl_4$ as a source of halide ions with the finely divided $(Nb_{1-x}Ta_x)_2O_5$ at a temperature whereat the halogen ions react with impurities in the $(Nb_{1-x}Ta_x)_2O_5$, whereupon the reacted impurities are extracted from the finely divided $(Nb_{1-x}Ta_x)_2O_5$ into the extraction phase; and separating the extraction phase and the reacted impurities contained therein from the finely divided $(Nb_{1-x}Ta_x)_2O_5$.

6. The process of claim 1, including, after said step of separating the extraction phase, the further step of:

separating the reacted impurities from the extraction phase and recycling the extraction phase back into said step of contacting.

7. The process of claim 1, wherein the removed impurities include 3d impurities.

8. A continuous liquid extraction process for purifying compounds of the form $(Nb_{1-x}Ta_x)_2O_5$, where x ranges from 0 to 1, comprising the steps of:
furnishing the $(Nb_{1-x}Ta_x)_2O_5$ in a finely divided form;
contacting an aqueous azeotropic mixture of an acid selected from the group consisting of hydrochloric acid, hydrobromic acid, and hydroiodic acid, to the finely divided $(Nb_{1-x}Ta_x)_2O_5$, whereupn impurities in the $(Nb_{1-x}Ta_x)_2O_5$ are extracted into the azeotropic mixture;
collecting the azeotropic mixture, with the extracted impurities, in a reservoir; and
evaporating azeotropic mixture from the reservoir and condensing the evaporated material at a location so that it may again contact the finely divided $(Nb_{1-x}Ta_x)_2O_5$, whereupon the impurities remain in the reservoir and are collected therein.

9. The process of claim 8, wherein said process is accomplished in a Soxhlet apparatus.

10. The process of claim 8, wherein said process is accomplished at a temperature of about 110° C.

11. The process of claim 8, wherein the impurities removed are 3d impurities.

12. The process of claim 8, wherein the acid is hydrochloric acid.

13. A process for purifying compounds of the form $(Nb_{1-x}Ta_x)_2O_5$, where x ranges from 0 to 1, comprising the steps of:
furnishing the $(Nb_{1-x}Ta_x)_2O_5$ in a finely divided form:
contacting a hydrochloric acid gas with the finely divided $(Nb_{1-x}Ta_x)_2O_5$ at a sufficiently high temperature that impurities in the $(Nb_{1-x}Ta_x)_2O_5$ react with the chloride to produce volatile chlorides of the impurities, which volatile chlorides of the impurities enter the gas phase and are thereby extracted from the finely divided $(Nb_{1-x}Ta_x)_2O_5$; and
separating the gas phase from the finely divided $(Nb_{1-x}Ta_x)_2O_5$.

14. The process of claim 13, wherein the process is accomplished at a temperature of from about 400° C. to about 750° C.

15. The process of claim 13, wherein the process is accomplished at a temperature of from about 400° C. to about 600° C.

16. A process for purifying compounds of the form $(Nb_{1-x}Ta_x)_2O_5$ where x ranges from 0 to 1, comprising the steps of:
furnishing the $(Nb_{1-x}Ta_x)_2O_5$ in a finely divided form;
contacting a gas containing a chloride, of the form $CH_zCl_{4-z}$, where z is from 0 to 3, inclusive, with the finely divided $(Nb_{1-x}Ta_x)_2O_5$ at a sufficiently high temperature that impurities in the $(Nb_{1-x}Ta_x)_2O_5$ react with the chloride to produce volatile chlorides of the impurities, which volatile chlorides of the impurities enter the gas phase and are thereby extracted from the finely divided $(Nb_{1-x})_2O_5$; and
separating the gas phase from the finely divided $(Nb_{1-x}Ta_x)_2O_5$.

17. A process for purifying compounds of the form $(Nb_{1-x}Ta_x)_2O_5$ where x ranges from 0 to 1, comprising the steps of:
furnishing the $(Nb_{1-x}Ta_x)_2O_5$ in a finely divided form;
contacting carbon tetrachloride with the finely divided $(Nb_{1-x}Ta_x)_2O_5$ at a sufficiently high temperature that impurities in the $(Nb_{1-x}Ta_x)_2O_5$ react with the chloride to produce volatile chlorides of the impurities, which volatile chlorides of the impurities enter the gas phase and are thereby extracted from the finely divided $(Nb_{1-x}Ta_x)_2O_5$; and
separating the gas phase from the finely divided $(Nb_{1-x}Ta_x)_2O_5$.

18. The process of claim 13, wherein the gas containing a chloride is carried in carbon dioxide carrier gas.

* * * * *